United States Patent [19]

Nishigori

[11] Patent Number: 5,023,713
[45] Date of Patent: Jun. 11, 1991

[54] MOTION DETECTION CIRCUIT FOR USE IN A TELEVISION

[75] Inventor: Yoshihisa Nishigori, Itami, Japan

[73] Assignee: Matsushita Electric Industrial Co., Ltd., Osaka, Japan

[21] Appl. No.: 511,773

[22] Filed: Apr. 20, 1990

[30] Foreign Application Priority Data

Apr. 24, 1989 [JP] Japan .................................. 1-103832

[51] Int. Cl.$^5$ ............................................. H04N 9/78
[52] U.S. Cl. ....................................... 358/105; 358/31
[58] Field of Search ................................. 358/105, 31

[56] References Cited

U.S. PATENT DOCUMENTS 4,768,092  8/1988  Ishikawa ............................. 358/105
4,885,631  12/1989  Fukinuki .............................. 358/31
4,967,271  10/1990  Campbell ............................ 358/105

FOREIGN PATENT DOCUMENTS 60-57792  4/1985  Japan .

OTHER PUBLICATIONS

Japanese magazine "Televi Gijyutu (Television Technique)" published Feb. 1989, pp. 25-38.

Primary Examiner—Howard W. Britton
Attorney, Agent, or Firm—Wenderoth, Lind & Ponack

[57] ABSTRACT

A motion detection circuit includes series connected delay circuits for obtaining, with respect to a perceived pixel based on a NTSC input signal, a pixel 262 lines preceding the perceived pixel, a pixel 263 lines preceding the perceived pixel, and a pixel one frame preceding the perceived pixel. A first threshold circuit is provided for comparing the amplitude of a first sum, which is the sum of the perceived pixel and the pixel one frame before, with a first threshold. A second threshold circuit is provided for comparing the amplitude of a second sum, which is the sum of the perceived pixel and the pixel 263 lines before, with a second threshold. A third threshold circuit is provided for comparing the amplitude of a third sum, which is the sum of the pixel 262 lines before the perceived pixel and the pixel one frame before the perceived pixel, with a third threshold. A logic circuit is provided for detecting a motion when the first sum is less than the first threshold and, at the same time, when at least one of two conditions is satisfied, the first condition being that the second sum is greater than the second threshold and the second condition being that the third sum is greater then the third threshold.

2 Claims, 6 Drawing Sheets

MOTION DETECTION CIRCUIT FOR USE IN A TELEVISION

BACKGROUND OF THE INVENTION

1. Field of the Invention

The present invention relates to a motion detection circuit for use in a television and, more particularly, to a circuit for detecting the motion of an image with respect to each pixel of the image.

2. Description of the Prior Art

One motion detection circuit 100 known in the prior art is shown in FIG. 1, which includes a low pass filter (LPF) 41, high pass filter (HPF) 46 frame memories 42, 47, 48 each of which delays the signal one frame period, subtracters 43, 49, absolute value circuits 44, 50, threshold circuits 45, 51 which compare the magnitude of the signal input thereto with a predetermined threshold, and logic circuit 52 which determines whether or not the image at each pixel has been changed.

In the operation of the circuit of FIG. 1, the NTSC signal is input from terminal 40 to LPF 41 and also to HPF 46. The LPF 41 passes the low frequency component of the NTSC signal, i.e., the low frequency luminance signal, to the frame memory 42. At the subtracter 43, the low frequency luminance signal which is not delayed is subtracted from the one frame delayed low frequency luminance signal, and the absolute value of the subtracter 43 output is obtained at the absolute value circuit 44. This operation is carried out for each pixel.

Because the two signals used for subtraction at subtracter 43 represent the same pixel position on the screen but delayed one frame, these two signals will be identical when the image at the pixel position is a still image, and the output of the absolute value circuit 44 is therefore zero. However, when there is motion in the image, the frame delayed signals differ, and a value other than zero is output from the absolute value circuit 44.

The output of the absolute value circuit 44 is compared with a threshold value by the threshold circuit 45. If the threshold value is smaller than the value produced from the absolute value circuit 44 it is assumed that the image at the corresponding pixel position is moving. In this case, threshold circuit 45 produces an output "1". However, if the threshold is greater, the image at the pixel position is assumed to be a still image. In this case, threshold circuit 45 produces an output "0".

The HPF 46 outputs a high frequency video signal in which the high frequency luminance signal and the chrominance subcarrier signal are mixed. This high frequency video signal is input sequentially to the two frame memories 47, 48. At subtracter 49 the undelayed high frequency video signal is subtracted from the delayed high frequency video signal. Since the phase of the chrominance subcarrier reverses every frame, the chrominance subcarrier signals with the same phase are subtracted at subtracter 49. The output of the subtracter 49 is input sequentially to the absolute value circuit 50 and the threshold circuit 51 as described above. The output from the threshold circuit 51 is "0" for a still image and "1" for a motion image, in a similar manner as described above.

The logic circuit 52 outputs a "1" when the output of at least one of the threshold circuits 45, 51 is producing "1". Specifically, the logic circuit 52 detects motion when motion is detected in either the low frequency luminance signal or the high frequency image signal, and in such a case, logic circuit 52 outputs "1".

Another motion detection circuit 200 known in the art is shown in FIG. 2, which includes a 262 H period delay 61 which delays the input signal 262 lines, subtracters 62, 65, a frame memory 64, absolute value circuits 63, 66, and threshold circuit 67.

In the operation of the circuit of FIG. 2, when the NTSC signal is input to terminal 60, the undelayed signal is subtracted from the 262 line delayed signal by the subtracter 62. Since the phase of the chrominance subcarrier applied directly from terminal 60 to subtracter 62 and that applied through 262 H delay 61 to subtracter 62 is the same, and since the 262 H delay is substantially equal to a difference between, e.g., one odd line and the neighboring even line, as shown in FIG. 3, subtracter 62 subtracts the data at pixel position P2 from the data at pixel position P1 (P1 and P2 also represent signal levels obtained at respective positions). Thus, the output from the subtracter 62 includes the vertical difference of the signals in a two-dimensional field in addition to the difference caused by the image movement. The difference signal (P1-P2) from subtracter 62 is input to the absolute value circuit 63 whereby the absolute value |P1-P2| of the signal is obtained. The output of the absolute value circuit 63 is input to the frame memory 64 and also to subtracter 65. Thus, the difference between the signal |P1'-P2'| delayed one frame and the signal |P1-P2| not delayed is obtained from the subtracter 65. The difference signal {|P1'-P2'|}-{|P1-P2|} output from the subtracter 65 is input to the absolute value circuit 66 whereby the absolute value of the signal is obtained, and the result is input to the threshold circuit 67.

FIG. 4 shows the relationship between the sampling point in each field and the phase of the subcarrier at that point. In FIG. 4, S0 represents a sampling point in field n, and S1 and S2 are sampling points in field n+1. S1 appears one line above S2 on the screen. S3 represents a sampling point in field n+2, and S4 a sampling point in field n+3. The direction of the arrow shown at each sampling point indicates the phase of the subcarrier; S0 and S1 have the same phase; S2, S3, and S4 each have the same phase, but are of an opposite phase relative to S0 and S1.

When the signal input from the input terminal 60 carries a still image, the difference signal output from the subtracter 62 is the difference of S0 and S1 in FIG. 3, indicating only the difference of the signals in the vertical of the two directions. When the image at the checking area CA is a still image, the two-dimension difference signal, such as |S0-S1|, is the same as that |S3-S4| obtained in the following frame, and the output from the subtracter 65 is therefore zero.

Furthermore, when the signal input from the terminal 60 carries a motion image, the difference signal, such as (S0-S1), output from the subtracter 62 is still the difference in the vertical (two-dimension) and now includes information indicating motion in the image. The information indicating motion is detected by subtracter 65, such that the output from the subtracter 65, ||S0-S1|-|S3-S4||, will not be zero because the difference signal will result from a different pattern in the next frame.

A conventional luminance signal/chrominance signal separation circuit using the motion detection circuit 100 or 200 described above is shown in FIG. 5.

The luminance signal/chrominance signal separation circuit includes a frame filter 71 which separates the chrominance signal using the perceived picture elements and the picture elements one frame period away, a two-dimensional filter 73 which separates the chrominance signal using the perceived picture elements and the proximal picture elements in the same field, the motion detection circuit 100 or 200 such as shown in FIG. 1 or FIG. 2, a switching circuit 72, a high pass filter (HPF) 74, and a subtracter 75.

According to the luminance signal/chrominance signal separation circuit shown in FIG. 5, when the video signal is input from the input terminal 70, the chrominance signals C1 and C2 are separated by the frame filter 71 and the two-dimensional filter 73, respectively. When the image is a still image, signal C1 is completely separated with hardly any defect. However, when the image is a motion image, C1 contains ghost image data and other image degradations such as artifact (including dot crawl and cross color) which will not be observed in the C2 signal. On the other hand, the C2 signal contains no new degradation whether the image is a still or motion image, although it is not a completely separated signal.

Furthermore, the switching circuit 72 selects C1 for still images or C2 for motion images according to the output from the motion detection circuit 100 or 200, and thus selects the chrominance signal with the least deterioration. The chrominance signal selected by the switching circuit 72 is limited to the high frequency band by the HPF 74, and is subtracted from the source signal by the subtracter 75 to obtain the luminance signal.

However, when an image with a pattern of vertical stripes in the high frequency component as shown in FIGS. 6a and 6b moves horizontally, the striped pattern in field n will be the precise reverse of that in field n+2 at a certain speed. This is further illustrated in detail in FIG. 6c.

FIG. 6c shows the sampling points in the horizontal direction for fields n, n+1, n+2, and n+3. As shown in field n, the vertical stripes are formed by a repeated pattern of four successive black and four successive white dots. If the sampling points move two points horizontally in each field, the field n+2 has a pattern which is the inverse of the black and white patter of field n, resulting in the same phase relationship as the chrominance signal.

For the purpose of description, four sampling points at the same level in the horizontal direction in each field have been labelled S01 to S34 as shown in FIG. 6c.

When this signal is input to the prior art motion detection circuit 100 of FIG. 1, no signal will pass through the LPF 41, and therefore, absolute circuit 44 always produces zero, because the signal for the vertical stripe has a high frequency component only. Thus, the motion detection must be based on the output of the HPF 46 only. As shown in FIG. 6c, this signal inverts every field, and signals two frames apart thus have the same phase. The output from the subtracter 49 is therefore zero, and the image carried by this signal is erroneously determined to be a still image.

When this same signal is input to the second prior art motion detection circuit 200 described above with reference to FIG. 2, the output from the subtracter 62 is also zero when S32 in field n+3 and S22 in field n+2 are used as sampling points, because these sampling points have the same phase. Furthermore, the output of the subtracter 65 is also zero because the output |S02−S12| from the frame memory 64 is equal to the output |S22−S32| from the absolute value circuit 63.

When the sampling point S33 of field n+3 and S23 of field n+2 are input to the subtracter 62, the output of the subtracter 62 has a value |S23−S33| which is not equal to zero because these two points are in reverse phase. However, the output of the frame memory 64 is equal to |S03−S13|, which is the same level as |S23−S33|, and therefore, the output of the subtracter 65 is zero. The second prior art motion detection circuit 200 of FIG. 2 thus erroneously determines that the image represented by the signal shown in FIGS. 6a and 6b is a still image.

As thus described, both the first and second prior art motion detection circuits of FIGS. 1 and 2 described hereinabove present a problem in that a pattern represented by the signal shown in FIGS. 6a and 6b will be erroneously evaluated as a still image when the signal is input to the circuit.

Thus, when the signal shown in FIGS. 6a and 6b is input to the luminance signal/chrominance signal separation circuit of FIG. 5 using either one of motion detection circuits of FIGS. 1 and 2, the image of FIGS. 6a and 6b is detected as a still picture. Thus, the frame filter output C1 is used even when the signal represents a motion image of FIGS. 6a and 6b. This results in introducing dot crawl, ghosts, and other image degradation.

SUMMARY OF THE INVENTION

The object of the present invention is therefore to provide an motion detection circuit which solves these problems.

In order to achieve the aforementioned objective, a motion detection circuit according to the present invention includes circuitry for obtaining, with respect to a perceiving pixel based on a NTSC input signal, a pixel 262 lines preceding the perceived pixel, a pixel 263 lines preceding the perceived pixel, and a pixel one frame preceding the perceived pixel; a first threshold circuit for comparing the amplitude of a first sum, which is the sum of the perceived pixel and the pixel one frame before, with a first threshold; a second threshold circuit for comparing the amplitude of a second sum, which is the sum of the perceived pixel and the pixel 263 lines before, with a second threshold; a third threshold circuit for comparing the amplitude of a third sum, which is the sum of the pixel 262 lines before the perceived pixel and the pixel one frame before the perceived pixels, with a third threshold; and a logic circuit for detecting a motion when the first sum is less than the first threshold and, at the same time, satisfying at least one of the two conditions that the second sum is greater than the second threshold and the third sum is greater than the third threshold.

The present invention as thus described can properly determine image motion even in images which would be erroneously determined to be still images by a conventional motion detection circuit.

Furthermore, by using the motion detection circuit of the present invention in the luminance signal/chrominance signal separation circuit, the separation with extremely low levels of image degradation is possible.

BRIEF DESCRIPTION OF THE DRAWINGS

These and other objects and features of the present invention will become clear from the following description taken in conjunction with the preferred embodiments thereof with reference to the accompanying drawings, throughout which like parts are designated by like reference numerals, and in which.

DETAILED DESCRIPTION OF THE PREFERRED EMBODIMENT

Figure 7:
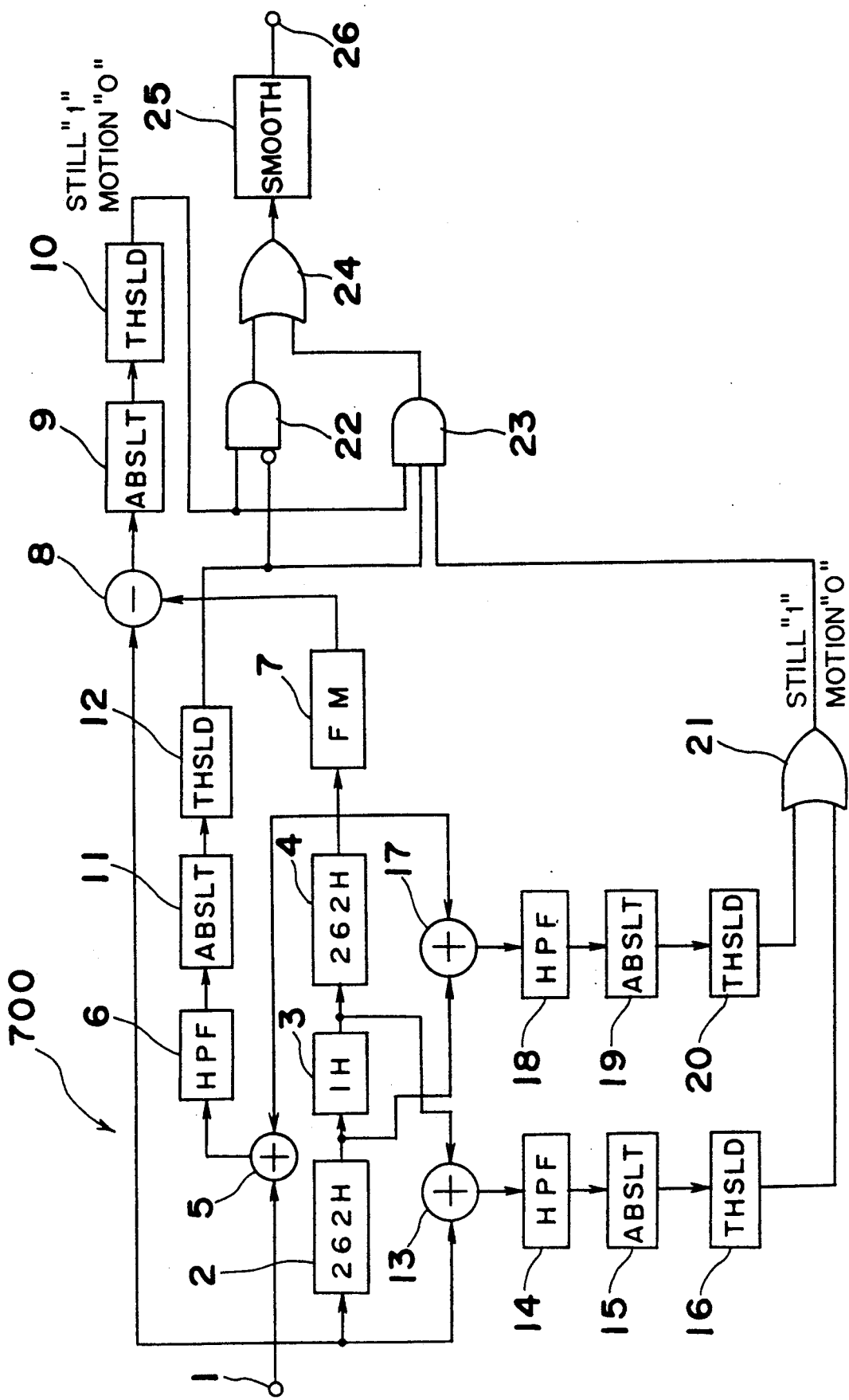
FIG. 7 is a block diagram of a motion detection circuit according to a preferred embodiment of the present invention.

FIG. 7 is a block diagram of a motion detection circuit 700 according to one preferred embodiment of the present invention.

In FIG. 7, reference number 1 is an input terminal for receiving the NTSC signal; 2 is a 262 H period delay which delays the input signal 262 lines; 3 is a 1 H period delay which delays the input signal one line; 4 is a 262 H period delay which delays the input signal 262 lines; 5, 13, and 17 are first, second, and third adders, respectively; 6, 14, and 18 are high pass filters (HPF); 7 is a frame memory; 8 is a subtracter; 11, 15, 19, and 9 are first, second, third, and fourth absolute value circuits, respectively; 12, 16, 20, and 10 are first, second, third, and fourth threshold circuits, respectively; 22 and 23 are AND circuits; 21 and 24 are OR circuits; and 25 is a smoothing circuit.

Figure 3:
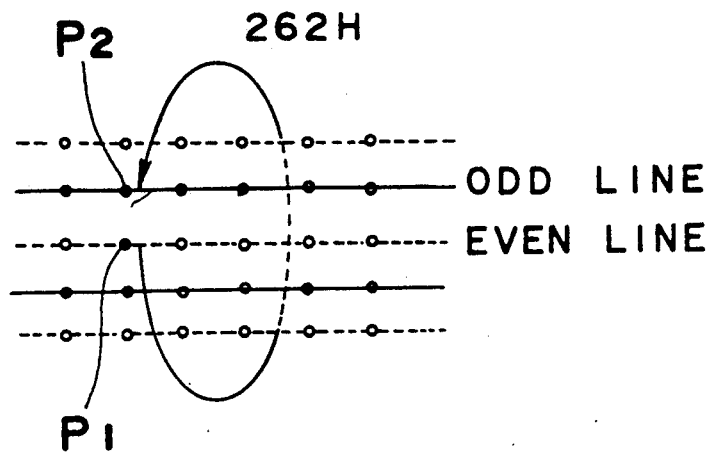
FIG. 3 is a diagram showing pixels of 262 H delay.
Figure 4:
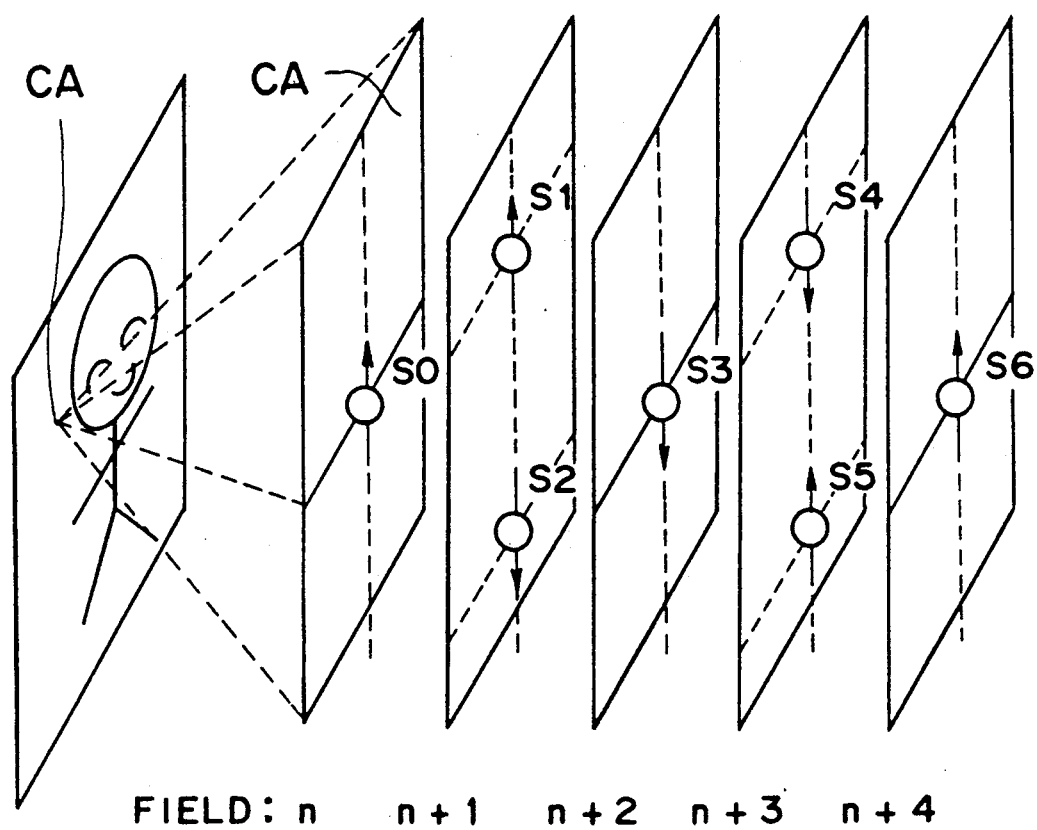
FIG. 4 is a diagram showing the phase of the subcarrier of the pixels in each field.
Figure 5:
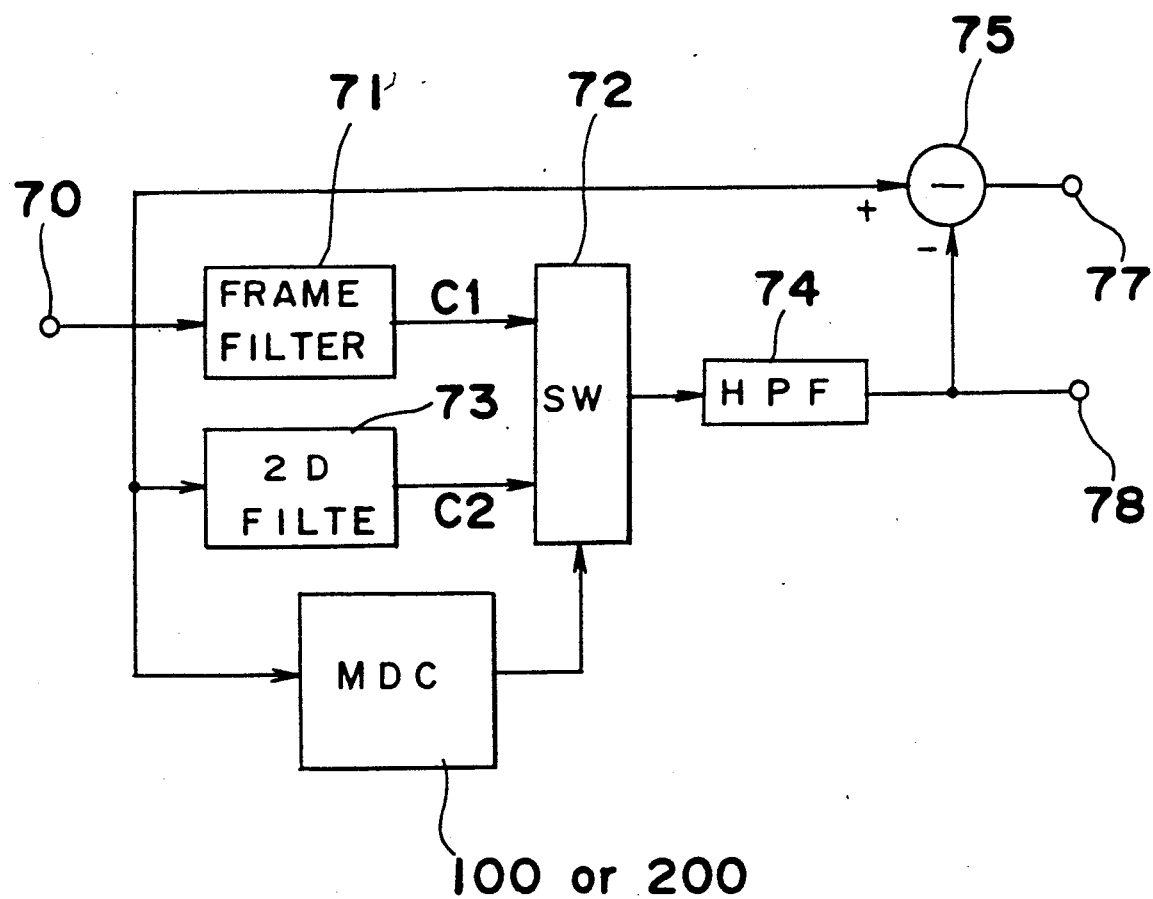
FIG. 5 is a block diagram of a prior art luminance signal/chrominance signal separation circuit.

When an NTSC signal is input from terminal 1 to a motion detection circuit 700 as thus described, the signal is applied through the 262 H period delay 2, 1 H period delay 3, to 262 H period delay 4, and so that the signal produced from 262 H period delay 4 is delayed precisely one frame period when compared with the signal applied to input terminal 1. If the signal S3 as shown in FIG. 4 is input, the outputs from the 262 H period delay 2, 1 H period delay 3, and 262 H period delay 4 will be S2, S1, and S0, respectively.

The sum (first sum) of the one frame delayed signal and the undelayed signal is obtained by the first adder 5. This first sum is input to the HPF 6 where the low frequency component is removed, and the absolute value of the result is obtained by the first absolute value circuit 11. The absolute value is then compared with the threshold (first threshold) of the first threshold circuit 12. If the input signal is less than the threshold, a "1" is output from the first threshold circuit 12. In other words, a "1" will be output from the first threshold circuit 12 when the amplitude of the signal delayed one frame is the same but the phase is reversed. This occurs when the image is a still image and there is only a chrominance signal, or when the luminance signal moves at a certain speed such as described above in connection with FIGS. 6a, 6b and 6c. Therefore, the output of the first threshold circuit 12 is shown in Table 1 below.

TABLE 1

|  | Only chrominance S. | Only luminance S. |
|---|---|---|
| Still | "1" | "0" |
| Motion | "0" | "1" |

The output from the 262 H period delay 4 is also applied to frame memory 7 in which the signal is further delayed by one frame period. Accordingly, a difference between the signal applied to terminal 1 and the two-frame delayed signal output from the frame memory 7 is obtained by the subtracter 8. Then, the absolute value of the difference is obtained by the fourth absolute value circuit 9, and the result is compared with a predetermined threshold (fourth threshold) of the fourth threshold circuit 10. If the absolute value is less than the threshold, a "1" is output.

The subtracter 8, fourth absolute value circuit 9, and fourth threshold circuit 10 form the normal motion detection circuit, and output "1" when the image is a still image.

The sum of the signal (S3 in FIG. 4) input from the terminal 1 and the output (S1 in FIG. 4) of the 1 H period delay 3, which are separated by 263 H periods, is produced by the second adder 13. The output from adder is applied to HPF 14 in which the low frequency component is removed, and further to the second absolute value circuit 15 and in turn to the threshold circuit 16. In the threshold circuit 16, the absolute value from absolute value circuit 15 is compared with a predetermined threshold (second threshold), and if the absolute value is less than the threshold, a "1" is output.

The sum of the output from the 262 H period delay 2 (S2 in FIG. 4) and the output from the 262 H period delay 4, which is 263 H periods away (S0 in FIG. 4) from the output of delay 2, is obtained by the third adder 17. The output from the third adder 17 is applied to HPF 18 in which the low frequency component is removed. The output from the HPF 18 is further applied to the third absolute value circuit 19 and in turn to threshold circuit 20. Thus, the absolute value of the output from HPF 18 is obtained by the third absolute value circuit 19 and the output thereof is compared with the threshold (third threshold) of the third threshold circuit 20. If the absolute value is less than the threshold, a "1" is output.

The output signals from the second threshold circuit 16 and the third threshold circuit 20 are applied to OR circuit 21. The output from the OR circuit 21 is input to AND circuit 23 together with the outputs from the fourth threshold circuit 10 and the first threshold circuit 12. If the input signal is for a still image with a chrominance signal only, the output from the fourth threshold circuit 10 will be "1" and the output from the first threshold circuit 12 will also be "1". Furthermore, because either S3 and S1 or S2 and S0 in FIG. 4 have a close correlation, the output of either the second adder 13 or the third adder 17 will be approximately zero, and the output of either the first or second threshold circuit 16, 20 will be "1" and the output of the OR circuit 21 will be "1". Therefore, all inputs to the AND circuit 23 will be "1" and the output will be "1" to indicate a still image.

Figure 6C:
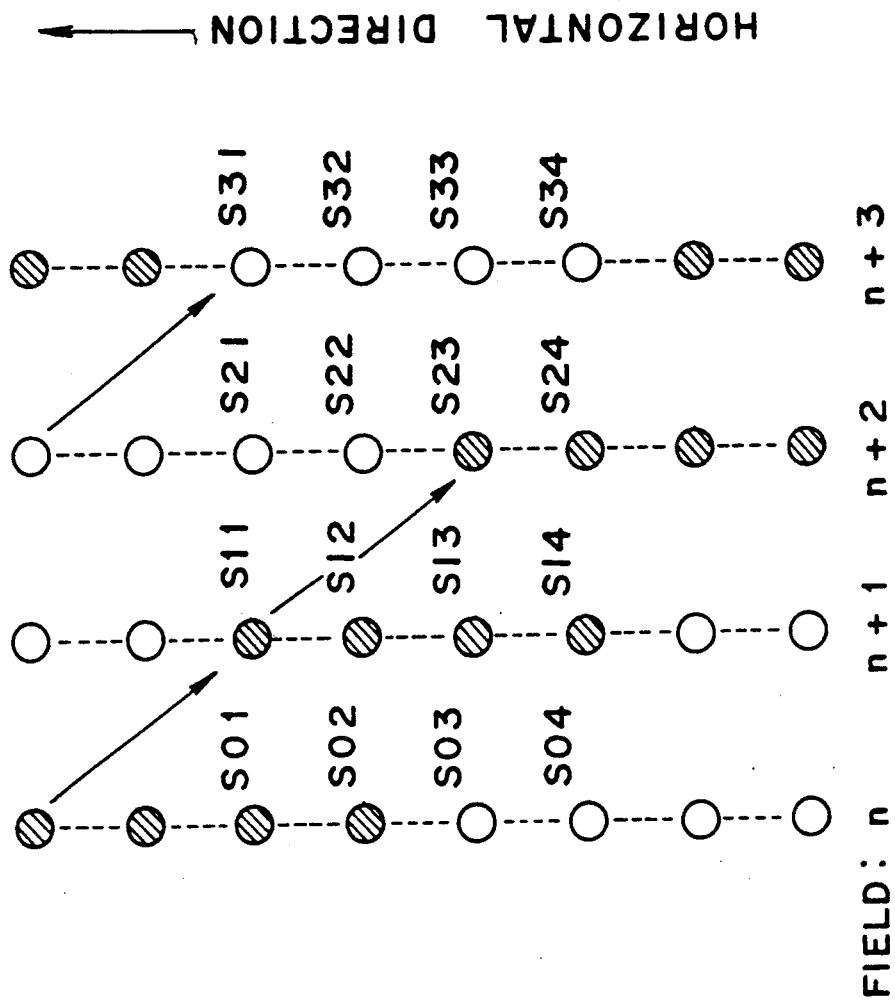
FIG. 6c is a further detailed plan views showing the motion of the vertical stripes.
Figure 6A:
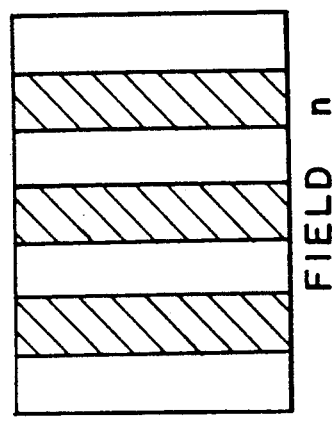
FIGS. 6a and 6b are fragmentary detailed plan views of a television screen showing vertical stripes in motion.
Figure 6B:
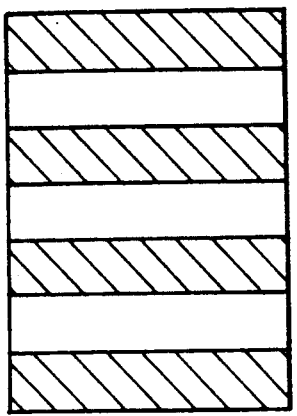

If the input signal from the terminal 1 carries a motion image as shown in FIGS. 6a, 6b and 6c, the outputs from the fourth threshold circuit 10 and the first threshold circuit 12 will both be "1". However, if the input signal represents a striped vertical pattern as shown in FIGS. 6a, 6b and 6c and the input sampling points are S23 and S24 in FIG. 6c, the output from the two adders 13, 17 has the amplitude of the input signal because the phases of the current and the previous field signals are the same, and the output for both threshold circuits 16 and 20 is therefore "0".

Therefore, the output of the OR circuit 21 is "0" and the output of the AND circuit 23 is also "0" to indicate a motion image.

The output of the fourth threshold circuit 10 and the inverse of the output of the first threshold circuit 12 are input to the AND circuit 22. If the AND circuit 22 determines that the amplitude of the signals one frame apart (S0 and S3 in FIG. 4) are different or that the phase of the same signals are the same, the output similar to that obtained by the prior art motion detection circuit is obtained.

The outputs from the two AND circuits 22 and 23 are input to the OR circuit 24. In those cases in which the prior art motion detection circuit would make an erroneous determination as explained in FIG. 4, the output from AND gate 23 is used for the final determination of a still image or motion image of the detecting pixel. More specifically, in such cases as explained in FIG. 4, the output of the AND circuit 22 produces "0" and, therefore, the output of AND circuit 23 is produced as it is from OR circuit 24. Thus, a correct determination of a still or motion image of each pixel is obtained with the output of AND circuit 23. Thus, during other times, the detection method similar to that of the prior art detection method is used.

The output of the OR circuit 24 is input to the smoothing circuit 25. If the input signal to the terminal 1 is a signal as shown in FIG. 4, the smoothing circuit 25 correctly determines a motion image because more than half of the sampling points are evaluated as a motion image.

Figure 8:
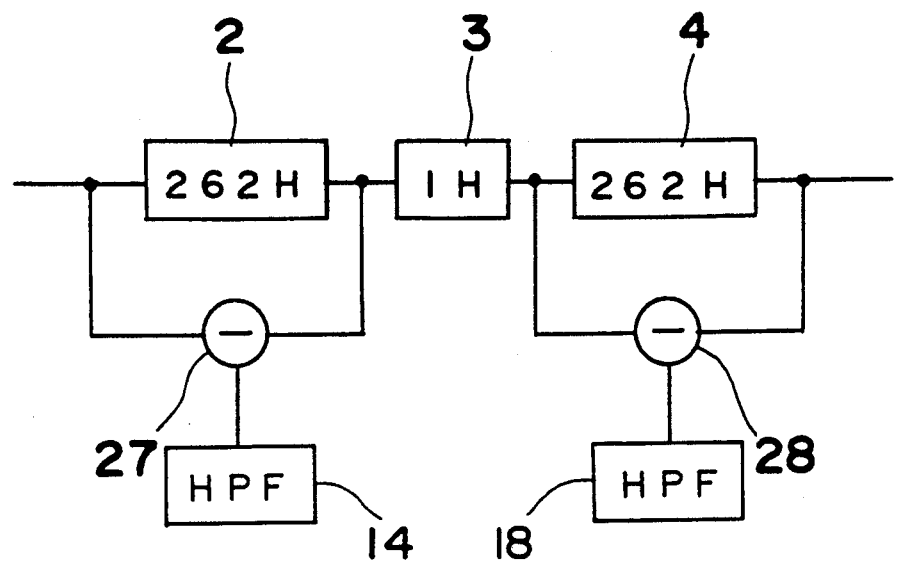
FIG. 8 is a block diagram showing a portion of a motion detection circuit according to a modification thereof.

Referring to FIG. 8, a modification is shown. Instead of adders 13 and 17, subtracters 27 and 28 are provided, respectively. In the modification, subtracter 27 is provided for producing a difference between the input and output of 262 H period delay 2, and subtracter 28 is provided for producing a difference between the input and output of 262 H period delay 4.

Figure 9:
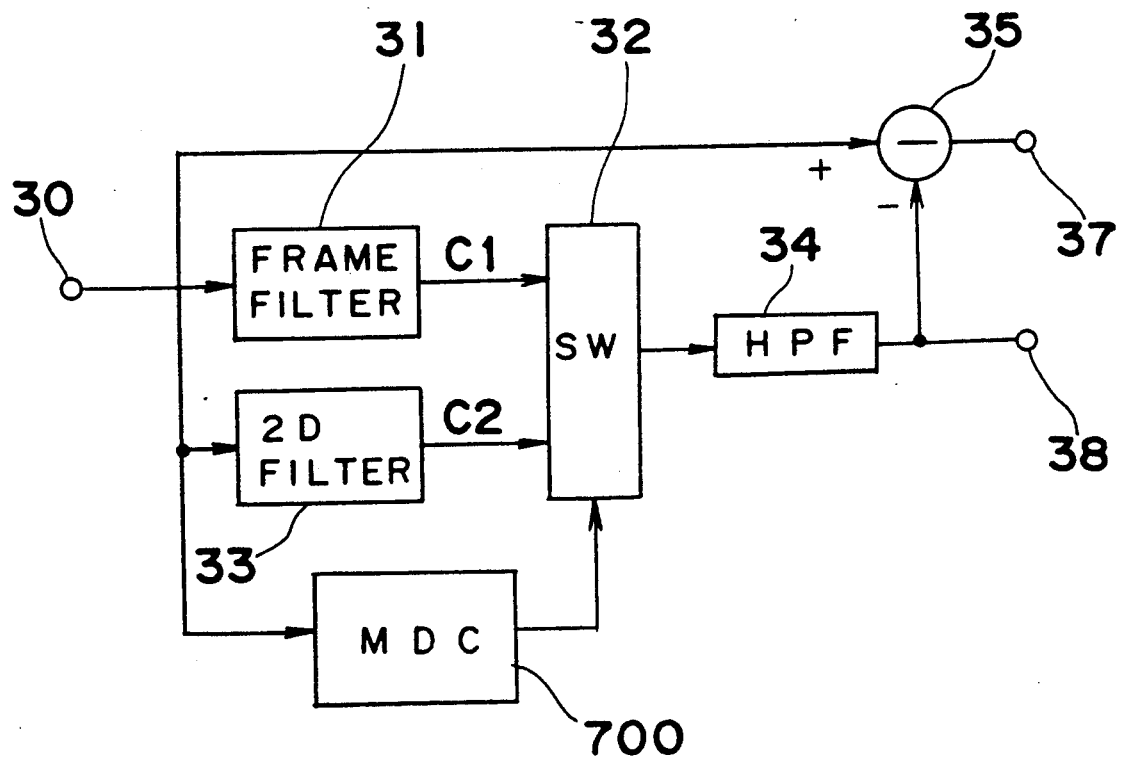
FIG. 9 is a block diagram of a luminance signal/chrominance signal separation circuit employing the motion detection circuit of the present invention.
Figure 1:
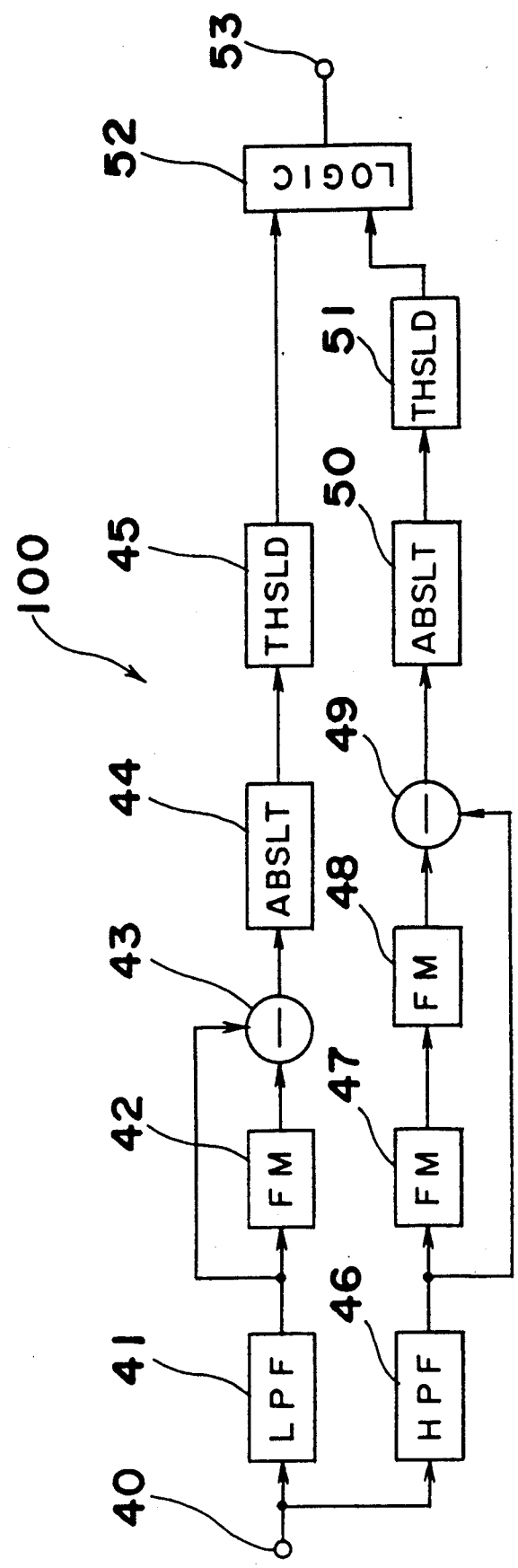
FIG. 1 is a block diagram of a prior art motion detection circuit.
Figure 2:
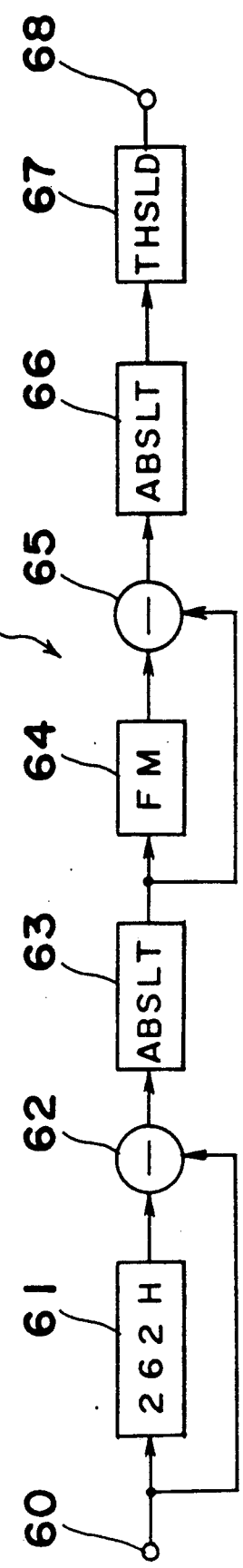
FIG. 2 is a block diagram of another prior art motion detection circuit.

Referring to FIG. 9, a block diagram of the luminance signal/chrominance signal separation circuit employing the motion detection circuit 700 of the present invention is shown.

In FIG. 9, reference number 31 is a frame filter which separates the chrominance signal using the perceived picture elements and the picture elements one frame away; 33 is a two-dimensional filter which separates the chrominance signal using the perceived picture elements and the proximal picture elements in the same field; 36 is a motion detection circuit according the preferred embodiment of the present invention; 32 is a switching circuit; 34 is a high pass filter (HPF); and 35 is a subtracter.

In a luminance signal/chrominance signal separation circuit thus constructed, chrominance signal C1 is separated by the frame filter 31 and chrominance signal C2 is separated by the 2D filter 33 when the video signal is input from the terminal 30. When the video image is a still motion image, chrominance signal C1 is completely separated, but when it is a motion video image, ghosts or other degradations not observed in signal C2, such as dot crawl, cross color are contained in the chrominance signal C1. Chrominance signal C2, however, is not completely separated in either a still or motion image, but it does not contain any new degradations. Depending on the output from the motion detection circuit 700, the switching circuit 32 selects C1 when the image is a still image, and C2 when the image is a motion image, thereby selecting the chrominance signal with the least degradation. The chrominance signal selected by the switching circuit 32 is filtered by the HPF 34 to contain a high frequency component only, which is subtracted from the source signal by the subtracter 35 to obtain the luminance signal.

Thus, there are no motion detection errors because motion detection is accomplished using the motion detection circuit 700 according to the first embodiment of the present invention, and ghosts, dot interference, and other degradation does not occur using the frame filter 31 whether or not the image is a motion image.

According to the present invention as described above, even in those cases in which the prior art motion detection circuit mistakenly determines that a motion image is a still image, erroneous determination of motion images can be prevented by investigating the relationship between the perceived sampling points, and the amplitudes of the sampling points in the previous field and the previous frame. Furthermore, because the frame filter and two-dimensional filter are switched using the motion detection circuit of the present invention in a luminance signal/chrominance signal separation circuit, the optimum filter can be used for the video material, and the practical effect is significant.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A motion detection circuit which comprises:
   means for obtaining, with respect to a perceived pixel based on a NTSC input signal, a pixel 262 lines preceding the perceived pixel, a pixel 263 lines preceding the perceived pixel, and a pixel one frame preceding the perceived pixel;
   first threshold circuit means for comparing the amplitude of a first sum, which is a sum of the perceived pixel and the pixel one frame preceding the perceived pixel, with a first threshold;
   second threshold circuit means for comparing the amplitude of a second sum, which is a sum of the perceived pixel and the pixel 263 lines preceding the perceived pixel, with a second threshold;
   third threshold circuit means for comparing the amplitude of a third sum, which is a sum of the pixel 262 lines preceding the perceived pixel and the pixel one frame preceding the perceived pixel, with a third threshold; and
   logic circuit means for detecting a motion when the first sum is less than the first threshold and, at the same time, when at least one of two conditions is satisfied, a first of the two conditions being that the second sum is greater than the second threshold and a second of the two conditions being that the third sum is greater than the third threshold.

2. A motion detection circuit which comprises:

means for obtaining, with respect to a perceived pixel based on a NTSC input signal, a pixel 262 lines preceding the perceived pixel, a pixel 263 lines preceding the perceived pixel, and a pixel one frame preceding the perceived pixel;

first threshold circuit means for comparing the amplitude of a first sum, which is a sum of the perceived pixel and the pixel one frame preceding the perceived pixel, with a first threshold;

second threshold circuit means for comparing the amplitude of a first difference, which is a difference between the perceived pixel and the pixel 262 lines preceding the perceived pixel, with a second threshold;

third threshold circuit means for comparing the amplitude of a second difference, which is a difference between the pixel 263 lines preceding the perceived pixel and the pixel one frame preceding the perceived pixel, with a third threshold; and logic circuit means for detecting a motion when the first sum is less than the first threshold and, at the same time, when at least one of two conditions is satisfied, a first of the two conditions being that the first difference is greater than the second threshold and a second of the two conditions being that the second difference is greater than the third threshold.

* * * * *